April 10, 1928.   A. C. CARLSON   1,665,729
COASTER WAGON STEERING GEAR
Filed Aug. 21, 1924   2 Sheets-Sheet 1

Artie C. Carlson  Inventor
N. S. Amstutz
Attorney

April 10, 1928.
A. C. CARLSON
COASTER WAGON STEERING GEAR
Filed Aug. 21, 1924
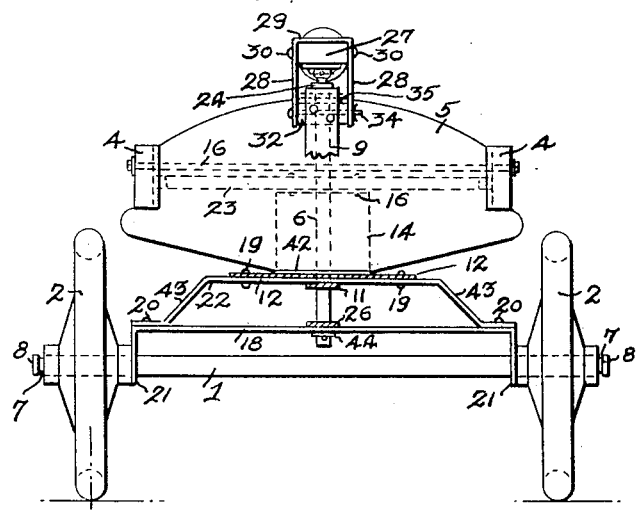
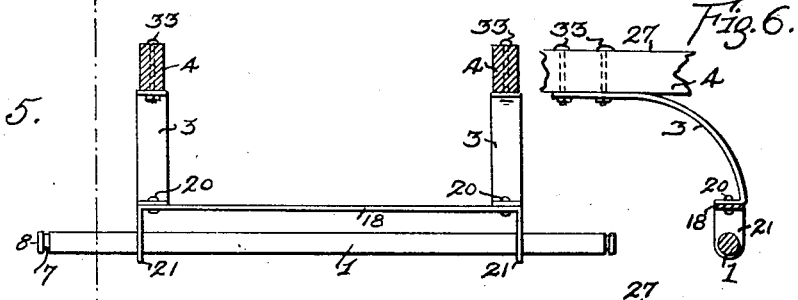
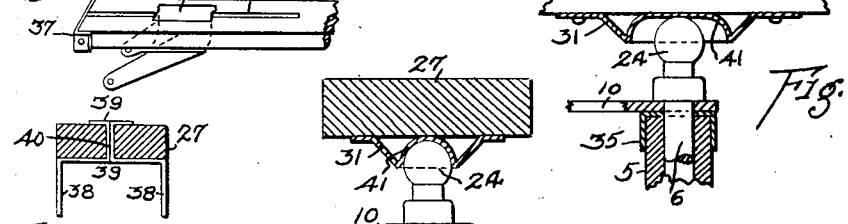
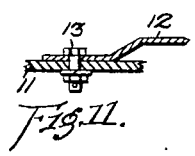

Patented Apr. 10, 1928.

1,665,729

UNITED STATES PATENT OFFICE.

ARTIE C. CARLSON, OF VALPARAISO, INDIANA, ASSIGNOR, BY MESNE ASSIGNMENTS, TO THE NORTHERN TRUST COMPANY AND HAROLD H. ROCKWELL AS TRUSTEES.

COASTER-WAGON STEERING GEAR.

Application filed August 21, 1924. Serial No. 733,352.

My invention relates to improvements in coaster wagon steering gear and it more especially consists of the features hereinafter pointed out in the annexed claims.

The purpose of my invention is to provide a coaster wagon in which the body has a low center of gravity; that admits of the steering gear being turned under the body more than 180 degrees; that secures the steering gear to the body near the extreme ends of the king bolt which prevents wear at the bottom of the front cross member of the body where the king bolt projects, that utilizes a steering handle which extends rearwardly over the body approximately on a horizontal plane; that coordinates a bearing surface on the steering handle with the center of the king pin; that combines the several parts constituting the steering gear and axle suspension in such a way that they are readily assembled though shipped in a knock-down condition; that forms a limit stop for the handle to prevent its touching the ground; that provides an axle supporting member which may be equally used on both the front and rear axles; and that provides an axle construction which is equally adapted for either front or rear axles.

With these and other ends in view, I illustrate in the accompanying drawing such instances of adaptation as will disclose the broad underlying features without limiting myself to the specific details shown thereon and described herein.

Fig. 4 is a front elevation of Fig. 1.

Fig. 5 is an elevation of the front axle support used in duplicate on the rear axle.

Fig. 6 is a side elevation of the rear axle spring attached to a duplicate of the front axle support.

Fig. 7 is a perspective view of a sliding steering handle.

Fig. 8 is a cross section of Fig. 7.

Fig. 9 is an enlarged detail of the steering handle pivot plate.

Fig. 10 is a central cross section of Fig. 9.

Fig. 11 is a detached section of the steering frame and steering plate holding means.

Fig. 12 is an elevation of a wheel retaining washer.

Figure 1:
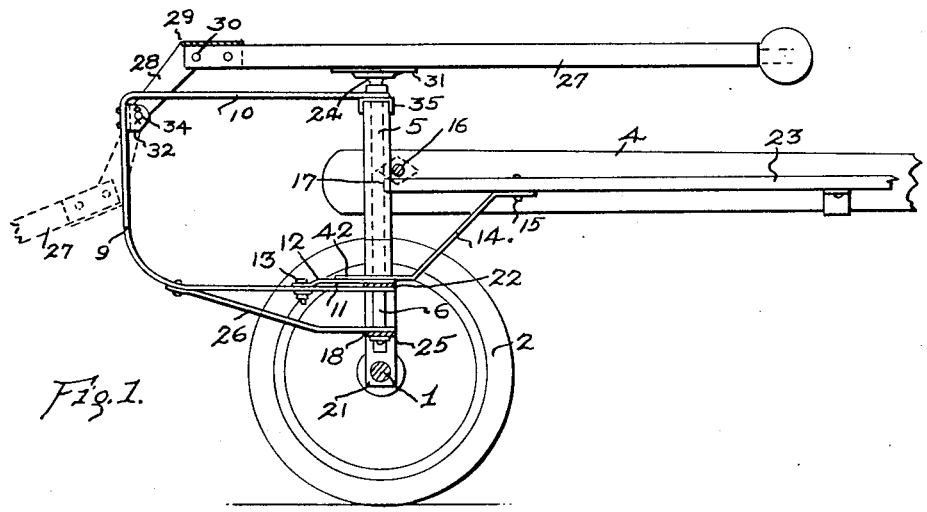
Figure 1 is a side elevation of the front end or steering portion of a coaster wagon.
Figure 2:
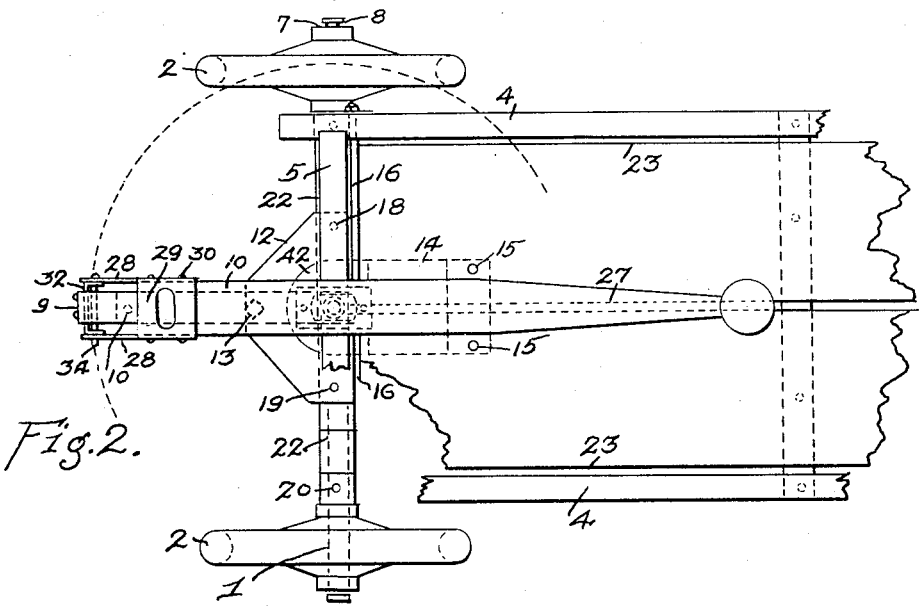
Fig. 2 is a plan view of Fig. 1.
Figure 3:
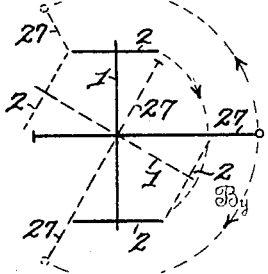
Fig. 3 is a diagrammatic plan view showing the extent of movement of the steering gear.

This application is a continuation in part of application Serial Number 673,963 filed November 10, 1923.

In practically carrying out my invention I may use any desired expedient in the details of construction that will lend themselves to meet the exigencies of actual practice within the limits of the broadest features of the invention.

The support for the coaster wagon is of course the front and rear axles 1 which may be duplicates of each other and their attached wheels 2. The body is composed of side rails 4 joined by a front cross member 5 and a rear cross member (not shown). The side rails 4 are held in rigid contact with the cross members by tie rods 16. Between the side rails 4, floor boards 23 are placed with their ends resting in grooves 17 and the special features of the body construction are made the subject matter of the above referred to application. The body is connected to the axles at the front end through the medium of the cross member 5 and the metallic under structure and at the rear end through the medium of curved springs 3 attached directly to the side rails by means of bolts 33. The toes at the lower ends of springs 3 are attached to the axle support 18 by means of rivets 20. This axle support has ears 21 through which the axle passes. A similar axle support 18 serves for both front and rear axles.

The front cross member 5 is provided with a vertical hole for the king pin 6. This king pin at its upper end may have a knob 24 formed integrally therewith or separately therefrom. Below the king bolt knob 24 the upper horizontal portion 10 of the steering frame 9 is located having a hole formed at its rear end through which the king bolt 6 passes. A specially formed washer plate 35 is placed between the wooden cross member 5 and the metal strap 10 to prevent the cross member 5 being worn as the member 10 moves around the king pin when the direction of movement of the coaster wagon is changed. The king pin 6 passes through the member 5 in a driving fit so as to be firmly held in the member 5. Below this member the king pin passes through the flat portion 42 of the floor brace plate 14 secured to the floor boards by bolts 15, then through the steering plate 12, the truss frame 22, the lower horizontal portion 11 of the steering frame 9, through the steering brace 26, the axle support 18, and the lower washer 44. Below the washer 44 a cotter pin 25 is placed.

The front axle support 18 has secured thereon a truss frame 22 with beveled sides 43 and feet adapted to rest on the axle support 18 where it is held by rivets 20. On top of the member 22 the steering plate 12 is secured by rivets 19 and this plate is secured to the portion 11 of the steering frame 9 by a bolt 13, nut and cotter pin as shown in Fig. 11. If desired, a well-known type of split washer may be placed between the nut and the part 11. The use of this bolt permits the steering frame 9 being disassembled for shipping purposes.

The coaster wagon is steered through the medium of the handle 27 which is attached to the steering frame 9 by means of a plate 29 secured to the handle by screws 30. This plate has a depending fork 28 pivoted to the bracket 32 by a pin 34. When the handle 27 is thrown forward as shown in the dotted lines of Fig. 1, the plate 29 forms a limit stop as it abuts the steering frame 9 thus preventing the free end of the steering handle from engagement with the ground. The axles 1 may have grooves 7 and shoulders 8 formed in their outer ends to accommodate wheel retaining washers 45.

The steering handle 27 by means of a plate 31 placed on its under side forms a fulcrum whose center is coincident with the center of the king pin 6 around which the entire steering mechanism moves. This plate has an elongated cup-shaped depression 41 in which the round head 24 of the king pin 6 rests as the coaster wagon is steered with the handle 27 in a horizontal position. This is the natural position for the handle to be in and in addition to the pivoting of the handle on the king pin it also serves as a very substantial support for the handle in contrast to the expedient disclosed in the application hereinbefore referred to.

If desired, the handle 27 may be made adjustable in length as shown in Figs. 7 and 8 wherein a lengthwise slot 36 is formed in the handle and a retaining plate 37 is secured to its end across the slot 36. The fork 38 is made of two parts with the center portions 40 riveted to each other. This portion 40 slides in the slot 36. It is held in place by horizontal portions 39 above and below the handle as shown in Fig. 8. When the handle 27 is made non-adjustable as shown in Fig. 1 the plate 29 with the fork 28 is formed of a single sheet metal stamping. The floor brace 14 is placed above the steering plate 12 in order that adequate wheel clearance be secured.

It will be seen that the coaster wagon steering gear is of rugged structure without complex details of manufacture and exceedingly efficient in operation. The front cross member 5 is safe guarded against any wear of the king bolt hole by reason of the upper washer plate 35 and the portion 42 of the floor brace 14. In fact, if desired, the openings through these parts may be near the same diameter as the king pin in order that the king pin through long usage will remain in correct vertical alignment. It will be noted that there is a certain amount of tension between the truss frame 22 and the axle support 18 which prevents the parts rattling and becoming a nuisance.

When the steering frame 9 by its lower member 11 is attached to the steering plate 12 by the bolt 13 it is to all intents and purposes rigidly connected therewith but at the same time bears a detachable relation to the plate 12. In using the words "rigidly connected" in the claims I do not limit myself to a rigid construction produced by means of a rivet instead of the bolt 13 because as explained heretofore the purpose of the bolt is to facilitate shipping so that the steering frame can remain disconnected from the axle suspension means and the front end of the body so as to permit the different parts of the coaster wagon to be packed within a small space.

What I claim is:

1. In coaster wagons, a body comprising a pair of side rails spaced apart by a front member, a tie rod passing through the side rails adjacent the front member, a king pin projecting above and below the front member, a steering frame projecting forward of the front member and having its free ends held in pivotal relation by the two ends of the king pin, axle suspension means detachably secured to the steering frame, a steering handle pivotally attached to the steering frame, and cooperating means on the steering handle adapted to position the handle on the upper end of the king pin whereby the turning of the steering gear is effected by a movement of the handle in an approximate horizontal plane around the center of the king pin.

2. In coaster wagons, a body having a front piece, a king pin mounted on the front piece, front wheel suspension means carried by the lower end of the king pin, a perforated plate secured to the body bent downward to pass beneath the front piece through which the king pin passes, a steering frame attached to the king pin below the perforated plate and also to said pin above the front piece, and a steering handle pivoted to the steering frame in such position that when the handle is in an approximate horizontal position it will be supported by the upper end of the king pin.

3. In coaster wagons, a body having side rails connected to a front and a rear end, floor boards supported by the ends, a front wheel suspension pivotally connected with the front end of the body, a steering frame rigid with the same, and a fifth wheel bearing with which said suspension means is pivotally connected, said bearing being in the form of a plate extending rearwardly and connected with the floor boards of the body whereby to transmit rearward thrusts to the body, and a king pin passing through the front end of the body and the plate.

4. A coaster wagon comprising a body in the form of a rigid substantially rectangular frame including a pair of narrow side rails and a front end piece holding the rails spaced apart projecting below the side rails, front wheel suspension means pivotally mounted at the lower edge of said front piece, and a steering frame pivotally connected to said front end piece and detachably connected to said suspension means.

5. A coaster wagon comprising a body having a front end piece of substantial width, front wheel suspension means in the form of a truss having ears to form endwise thrust bearings for the wheels, an axle in such ears, a king pin passing through said front end piece and said truss, a steering frame pivotally connected to said king pin and connected to the front wheel suspension means, and a plate of substantial width providing a bearing or fifth wheel between said front piece and the truss member.

6. In coaster wagons, a substantially rectangular body comprising a front end piece, a suspension means, a king pin of substantial length projecting above and below the end piece, a U-shaped steering frame pivotally connected to opposite ends of the king pin and connected with the suspension means, said steering frame being adapted to clear the front corners of the body, and a handle pivotally connected to said steering frame.

7. In coaster wagons, a body having a front and cross member, front wheel suspension means pivotally supporting the front end of the body, a steering gear comprising a one piece U-shaped vertically positioned steering frame rigid with said suspension, and means for pivotally connecting the steering frame to the front end cross member of the body whereby the steering frame is adapted to swing through an arc of not less than ninety degrees relative to the center of the body.

8. In coaster wagons, a body, front wheel suspension means comprising a king pin of substantial length mounted in the body and projecting above and below the body, a U-shaped steering frame pivotally connected to opposite ends of the king pin and rigidly connected with said suspension means, a handle pivotally connected to said steering frame, and stop means for limiting the forward and rearward swinging movements of the handle.

9. In coaster wagons, a one-piece U-shaped steering frame having an upper portion, a forward portion, and a lower portion, and a handle pivotally mounted on said steering frame near the junction of said upper and forward portions, the forward end of the handle being adapted to engage the said front portion of the steering frame to support the handle in an inclined position when extending forwardly and downwardly from the body.

10. In coaster wagons, a body, a king pin secured to the body, a steering frame including a front portion, upper and lower portions, the latter being pivoted on the king pin, a steering handle, a projection from the handle pivoted to the front portion of the steering frame, and a stop constituting the pivoted end of the handle adapted in the forward movement of the handle to engage the front portion of the steering frame and in its rearward movement to engage the king pin to limit the forward and rearward swinging movements of the handle.

11. In coaster wagons, a front wheel axle suspension comprising an arched truss member, a tie bar having wheel positioning ears in which the axle is supported, means for connecting the ends of said member to the tie bar, a steering frame, and means for rigidly connecting said frame to said member.

12. In coaster wagons, a body, front wheel suspension means comprising an upper truss member, a tie bar having wheel positioning ears and connecting the ends of the truss member, and a steering gear comprising a steering frame rigidly connected to said member and pivotally connected to the body.

13. In coaster wagons, front wheel suspension means including an arch truss member, a tie bar having wheel positioning ears and connecting the ends of the truss member, said member, and tie bar being apertured to provide spaced bearings for a king pin, and a steering frame connected to said member and pivotally connected to the body.

14. In coaster wagons, a body, a steering gear therefor, a king pin passing through the body and the steering gear and projecting above the body, a steering handle pivoted to the steering gear for vertical movement, a channeled self positioning plate on the handle adapted to engage the projecting end of the king pin to hold the steering handle in position on the king pin against any disengaging horizontal movement while leaving the steering handle free to be moved vertically away from the king pin.

15. In coaster wagons, a body having a front end, a king pin passing through the body and projecting above the same, a steering member conected to the king pin above and below the front end of the body, a steering handle pivotally connected to the steering member, and means for holding the steering handle in engagement with the king pin while free to be moved vertically away from the king pin.

16. In coaster wagons, a body having a transverse front end, a steering gear cooperating with the front end of the body, a king pin positioned on the front end, means for pivoting the steering gear to the king pin above and below the front end, a steering handle pivoted to the steering gear for vertical movement, said steering handle engaging the king pin while the handle is in a horizontal position, and cooperating means between the handle, steering gear and king pin adapted to removably hold the steering handle and steering gear in pivotal relation to the king pin, against horizontal displacement of the steering handle in respect of the axis of the king pin.

In testimony whereof I affix my signature.

ARTIE C. CARLSON.